(12) United States Patent
Kim et al.

(10) Patent No.: US 10,635,353 B2
(45) Date of Patent: Apr. 28, 2020

(54) METHOD OF TRANSCEIVING DATA USING PHYSICAL PAGE ADDRESS (PPA) COMMAND ON OPEN-CHANNEL SOLID STATE DRIVE (SSD) AND AN APPARATUS PERFORMING THE SAME

(71) Applicant: Circuit Blvd., Inc., Sunnyvale, CA (US)

(72) Inventors: Bumsoo Kim, Saratoga, CA (US); Young Tack Jin, Cupertino, CA (US)

(73) Assignee: CIRCUIT BLVD., INC., Sunnyvale, CA (US)

( * ) Notice: Subject to any disclaimer, the term of this patent is extended or adjusted under 35 U.S.C. 154(b) by 38 days.

(21) Appl. No.: 15/992,184

(22) Filed: May 30, 2018

(65) Prior Publication Data
US 2019/0369910 A1    Dec. 5, 2019

(51) Int. Cl.
*G06F 3/06* (2006.01)
*G06F 12/02* (2006.01)

(52) U.S. Cl.
CPC .......... *G06F 3/0659* (2013.01); *G06F 3/0613* (2013.01); *G06F 3/0673* (2013.01); *G06F 12/0246* (2013.01)

(58) Field of Classification Search
CPC ..... G06F 3/0659; G06F 3/0613; G06F 3/0673
See application file for complete search history.

(56) References Cited

U.S. PATENT DOCUMENTS

| | | | |
|---|---|---|---|
| 2016/0085718 A1* | 3/2016 | Huang | H04L 29/08 709/213 |
| 2017/0249080 A1* | 8/2017 | Bonnet | G06F 3/061 |
| 2019/0035445 A1* | 1/2019 | Huang | G11C 8/18 |
| 2019/0095123 A1* | 3/2019 | Lin | G06F 3/0647 |

OTHER PUBLICATIONS

Matias Bjorling, LightNVM: The Linux Open-Channel SSD Subsystem, Mar. 2, 2017, All (Year: 2017).*
NVMExpress.org, NVM Express Revision 1.3, May 1, 2017 (Year: 2017).*
"Open-Channel Solid State Drives NVMe Specification", Revision 1.2, Apr. 2016, 24 pages.
"Open-Channel Solid State Drives Specification", Revision 2.0, Jan. 29, 2018, pp. 1-28.
Jhuyeong Jhin et al., "Implementation of Open-channel SSD Emulator supporting LightNVM", 2016, pp. 1228-1230, KR.

* cited by examiner

*Primary Examiner* — Ryan Bertram
(74) *Attorney, Agent, or Firm* — Cantor Colburn LLP

(57) ABSTRACT

Disclosed is a method of transceiving data using a physical page address (PPA) command on an open-channel solid state drive (SSD), the method including transmitting, by a host, a PPA command to a controller using a submission queue, and performing, by the controller, an operation based on the PPA command, wherein the PPA command includes an operation code (Opcode) to operate the controller and a PPA list for the controller to perform the Opcode on a memory, and the PPA list includes at least one PPA and bitmap information related to the at least one PPA.

13 Claims, 17 Drawing Sheets

| | |
|---|---|
| [0] 1111, ch, lun, ~~0~~, blk, pg, ~~0~~ | —311 |
| [1] 0101, ~~ch, lun, 1,~~ blk', ~~pg, 0~~ | —312 |
| [2] 1001, ~~ch, lun, 0, blk, pg+1, 0~~ | —313 |
| [3] 0000, ~~ch, lun, 1, blk', pg+1, 0~~ | —314 |
| [4] 1000, ~~ch, lun, 0, blk, pg+2, 0~~ | —315 |
| [5] 0001, ~~ch, lun, 1, blk', pg+2, 0~~ | —316 |
| [6] 0000, ~~ch, lun, 0, blk, pg+3, 0~~ | —317 |
| [7] 0110, ~~ch, lun, 1, blk', pg+3, 0~~ | —318 |

FIG. 3C

| ch, lun pg%4=0 | blk on plane 0 1 | | | | blk' on plane 1 1 | | | |
|---|---|---|---|---|---|---|---|---|
| pg | 1 | 1 | 1 | 1 | 0 | 1 | 0 | 1 |
| +1 | 1 | 0 | 0 | 1 | 0 | 0 | 0 | 0 |
| +2 | 1 | 0 | 0 | 0 | 0 | 0 | 0 | 1 |
| +3 | 0 | 0 | 0 | 0 | 0 | 1 | 1 | 0 |
| sector | 3 | 2 | 1 | 0 | 3 | 2 | 1 | 0 |

FIG. 4B

402 ppa: bitmap, ch, lun, pln, blk, pg, sect

| [0] 0011, ch, lun, ~~0,~~ blk, pg, ~~0~~ | —411 |
| [1] 0011, ~~ch, lun, 1,~~ blk', ~~pg, 0~~ | —412 |

FIG. 4C

| ch, lun pg%4=0 | bitmap | blk on plane 0 1 | | | | blk' on plane 1 1 | | | |
|---|---|---|---|---|---|---|---|---|---|
| pg | 1 | 1 | 1 | 1 | 1 | 1 | 1 | 1 | 1 |
| +1 | 1 | 1 | 1 | 1 | 1 | 1 | 1 | 1 | 1 |
| +2 | 0 | | | | | | | | |
| +3 | 0 | | | | | | | | |

FIG. 5B

502 ppa : ch, lun, pln, blk, pg, sect

[0] ch, lun, ~~pln~~, blk, ~~pg, sect~~ — 511

FIG. 6B

602 ppa : ch, lun, pln, blk, pg, sect

| [0] ch, lun, ~~0,~~ blk, ~~pg,~~ ~~0~~ | —611 |
| [1] ~~ch, lun, 1,~~ blk', ~~pg, 0~~ | —612 |

METHOD OF TRANSCEIVING DATA USING PHYSICAL PAGE ADDRESS (PPA) COMMAND ON OPEN-CHANNEL SOLID STATE DRIVE (SSD) AND AN APPARATUS PERFORMING THE SAME

BACKGROUND

1. Field

One or more example embodiments relate to a method of transceiving data using a physical page address (PPA) command on an open-channel solid state drive (SSD) and an apparatus performing the same.

2. Description of Related Art

With the gradual improvement of the performance of a processor, demanding specifications for a memory are increasing. A disk-based storage medium, for example, a hard disk drive (HDD), exhibits an excellent performance in successive address access. However, the performance decreases when accessing a random address.

Thus, a non-volatile memory (NVM) having advantages of a fast speed of response and a low power consumption is used for many computing systems as a storage device that substitutes for the HDD. The NVM includes, for example, a flash memory-based solid state drive (SSD).

To improve a bandwidth of such an NVM storage device, studies and developments based on a parallel structure have been conducted. For example, when using a multi-channel structure or multi-way structure for the NVM storage device, the bandwidth improves.

However, in this example, a bandwidth of a host interface used in the HDD-based storage device limits the bandwidth of the NVM storage device. Thus, a peripheral component interconnect express (PCIe) interface was used as the host interface of the NVM storage device. Further, a new NVM express (NVMe) interface was invented for a PCIe interface-based SSD.

Unlike an existing interface that defines a command set and an optimized register and operates with a single input/output (I/O) queue, the NVMe interface has a multi-queue structure and enables an individual queue to be used for each application, thereby increasing I/O parallelism. Further, the NVMe interface supports completion processing with respect to multiple queues/multiple commands with a single interrupt occurring in an SSD.

SUMMARY

According to an aspect, there is provided a communication method for a host and a controller, the communication method including transmitting, by the host, a physical page address (PPA) command to the controller using a submission queue, and performing, by the controller, an operation based on the PPA command, wherein the PPA command may include an operation code (Opcode) to operate the controller and a PPA list for the controller to perform the Opcode on a memory, and the PPA list may include at least one PPA and bitmap information related to the at least one PPA.

The bitmap information may include bitmap information to perform a read operation on a sector of the memory.

The PPA list may further include information related to a channel, a logical unit number, a block, and a page with respect to a first PPA among the at least one PPA to perform the read operation.

The PPA list may further include information related to a block with respect to a second PPA among the at least one PPA to perform the read operation.

The bitmap information may include bitmap information to perform a write operation on a page of the memory.

The PPA list may further include information related to a channel, a logical unit number, a block, and a page with respect to a first PPA among the at least one PPA to perform the write operation.

The PPA list may further include information related to a block with respect to a second PPA among the at least one PPA to perform the write operation.

The PPA list may further include information related to at least one of a channel, a logical unit number, a plane, a block, a page, and a sector with respect to the at least one PPA.

The PPA command may further include bitmap information related to a plane on which the controller is to perform the operation in the memory.

The PPA command may further include a total number of the at least one PPA.

The PPA list may further include status information of the memory.

The status information of the memory may include at least one of an erase time, a write time, and a read time.

The status information of the memory may include a total number of error bits verified when performing a read operation.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 3A through 3C illustrate a physical page address (PPA) command, a PPA list, and a sector bitmap for a read operation;

FIGS. 4A through 4C illustrate a PPA command, a PPA list, and a page bitmap for a write operation;

FIGS. 5A through 5C illustrate a PPA command, a PPA list, and a page bitmap for an erase operation;

FIGS. 6A through 6C illustrate a PPA command, a PPA list, and a page bitmap for an erase operation;

DETAILED DESCRIPTION

Figure 1:
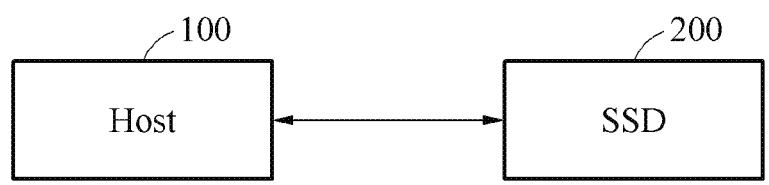
FIG. 1 is a block diagram illustrating a solid state drive (SSD) system according to an example embodiment.

Hereinafter, reference will now be made in detail to examples with reference to the accompanying drawings, wherein like reference numerals refer to like elements throughout. Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 is a block diagram illustrating a solid state drive (SSD) system according to an example embodiment.

Referring to FIG. 1, an SSD system may include a host 100 and an SSD device 200.

The host 100 may transmit a command to the SSD device 200 based on a command from a user of the SSD system. The SSD device 200 may perform an operation based on the command received from the host 100. For example, the SSD device 200 may perform an operation of reading, writing, or erasing.

The SSD device 200 may not include firmware of a flash translation layer (FTL). For example, the SSD device 200 may be an open-channel SSD device. That is, the SSD device 200 may provide the host 100 with information related to internal parallelism of the SSD device 200 such that the host 100 may perform physical mapping on the SSD device 200. The internal parallelism of the SSD device 200 may be expressed as shown in Table 1 according to versions of open-channel SSD.

Table 1 represents internal parallelism of the SSD device 200 with respect to physical page addresses (PPAs) of Version 1.2 and Version 2.0 of open-channel SSD.

TABLE 1

| OCSSD ver | PPA(64bit) | | | | | |
|---|---|---|---|---|---|---|
| 1.2 | ch | lun | pln | blk | pg | sect |
| 2.0 | group | pu | chunk | | logical block | |

In a case in which the SSD device 200 complies with Version 1.2 of open-channel SSD, the PPA of the SSD device 200 may include a channel (ch), a logical unit number (lun), a plane (pln), a block (blk), a page (pg), and a sector (sect).

In a case in which the SSD device 200 complies with Version 2.0 of open-channel SSD, the PPA of the SSD device 200 may include a group, a parallel unit (pu), a chunk, and a logical block. In this example, the group may correspond to the channel, the parallel unit may correspond to the logical unit number, the chunk may correspond to the plane and the block, and the logical block may correspond to the page and the sector.

The host 100 and the SSD device 200 may communicate with each other using a software interface. In this example, the software interface may be a non-volatile memory express (NVMe)-based interface. That is, the host 100 may transmit a command to the SSD device 200 through a submission queue. A controller of the SSD device 200 may perform an operation by referring to the submission queue. The controller of the SSD device 200 may report a result of performing the operation to the SSD device 200 through a completion queue.

The submission queue may include a 64-byte submission queue entry including a metadata pointer (MPTR), a data pointer (DPTR), a starting logical block addressing (SLBA), and a number of logical blocks (NLB). The completion queue may include a 16-byte completion queue entry including a status code type (SCT) and a status code (SC).

Admin commands that the host 100 transmits to the SSD device 200 through the submission queue in Version 1.2 of open-channel SSD may be represented as shown in Table 2.

TABLE 2

| Opcode (07) Generic | Opcode (06:02) Function | Opcode (01:00) Data Transfer | NVMe Opcode | O/M | Command |
|---|---|---|---|---|---|
| 1b | 110 00b | 10b | E2h | M | Device Identification |
| 1b | 110 00b | 01b | F1h | O | Set Bad Blocks Table |
| 1b | 110 00b | 10b | F2h | O | Get Bad Blocks Table |

The host 100 may enumerate an inner configuration of the SSD device 200 based on the Admin commands of Table 2, and manage an internal bad block table.

Input/output (I/O) commands that the host 100 transmits to the SSD device 200 through the submission queue in Version 1.2 of open-channel SSD may be represented as shown in Table 3.

TABLE 3

| Opcode (07) Generic | Opcode (06:02) Function | Opcode (01:00) Data Transfer | NVMe Opcode | O/M | Command |
|---|---|---|---|---|---|
| 1b | 001 00b | 00b | 90h | M | Physical Block Erase |
| 1b | 001 00b | 01b | 91h | M | Physical Page Address Write |
| 1b | 001 00b | 10b | 92h | M | Physical Page Address Read |
| 1b | 001 01b | 01b | 95h | O | Physical Page Address Raw Write |
| 1b | 001 01b | 10b | 96h | O | Physical Page Address Raw Read |

The host 100 may perform an operation of erasing, writing, or reading based on the I/O commands of Table 3.

Admin commands that the host 100 transmits to the SSD device 200 through the submission queue in Version 2.0 of open-channel SSD may be represented as shown in Table 4.

TABLE 4

| Opcode (07) Generic | Opcode (06:02) Function | Opcode (01:00) Data Transfer | NVMe Opcode | O/M | Namespace Identifier Used | Command |
|---|---|---|---|---|---|---|
| 1b | 110 00b | 10b | E2h | M | Yes | Geometry |
| 0b | 000 00b | 10b | 02h | M | Yes | Get Log Page - Chunk Information |
| 0b | 000 10b | 01b | 09h | M | Yes | Set Features - Media Feedback |
| 0b | 000 10b | 10b | 0Ah | M | Yes | Get Features - Media Feedback |

The host 100 may enumerate an inner configuration of the SSD device 200 based on the Admin commands of Table 4, and read a state of an individual chuck.

I/O commands that the host 100 transmits to the SSD device 200 through the submission queue in Version 2.0 of open-channel SSD may be represented as shown in Table 5.

TABLE 5

| Opcode (07) Generic | Opcode (06:02) Function | Opcode (01:00) Data Transfer | NVMe Opcode | O/M | Command |
|---|---|---|---|---|---|
| 0b | 000 00b | 01b | 01h | M | Write (From NVMe 1.3 specification) |
| 0b | 000 00b | 10b | 02h | M | Read (From NVMe 1.3 specification) |
| 0b | 000 10b | 01b | 09h | M | Data Management (From NVMe 1.3 specification) |
| 1b | 001 00b | 00b | 90h | O | Vector Chunk Reset |
| 1b | 001 00b | 01b | 91h | O | Vector Chunk Write |
| 1b | 001 00b | 10b | 92h | O | Vector Chunk Read |
| 1b | 001 00b | 11b | 93h | O | Vector Chunk Copy |

The host 100 may perform an operation of data management, resetting, writing, reading, or copying based on the I/O commands of Table 5.

Figure 2:
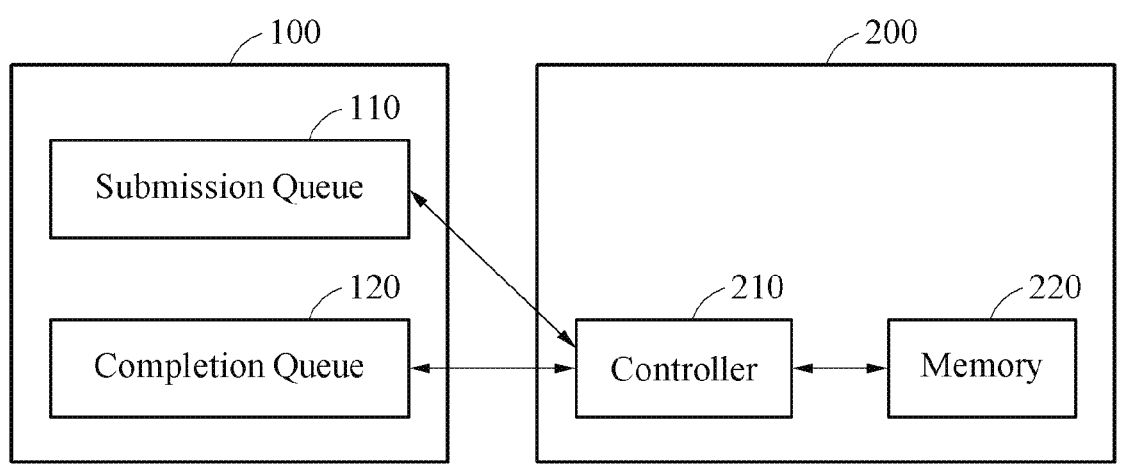
FIG. 2 illustrates an operation of an SSD system according to an example embodiment.

FIG. 2 illustrates an operation of an SSD system according to an example embodiment.

Referring to FIG. 2, the host 100 may include a submission queue 110 and a completion queue 120. For example, the host 100 may include a memory. Queues including the submission queue 110 and the completion queue 120 may be installed for each core, and if the SSD system is a multi-processor, the efficiency may improve.

The host 100 may write a command to be transmitted to the SSD device 200 through the submission queue 110. For example, the host 100 may write a physical page address (PPA) command on the submission queue 110.

The PPA command may include an operation code (Opcode) to operate a controller 210 and a PPA list for the controller 210 to perform the Opcode on a memory 220. The Opcode may be represented as in Table 2 through Table 5. The Opcode may refer to a command operation code. The PPA command may include a plane bitmap with respect to a plane on which the controller 210 is to perform an operation in the memory 220. Further, the PPA command may further include a total number of at least one PPA included in the PPA list.

The PPA list may include at least one PPA and bitmap information with respect to the at least one PPA. The PPA list may further include information related to at least one of a channel, a logical unit number, a plane, a block, a page, and a sector with respect to the at least one PPA.

The bitmap information may include a sector bitmap to perform a read operation on a sector of the memory 220 or a page bitmap to perform a write operation on a page of the memory 220.

Further, the PPA list may further include information related to a status of the memory 220. For example, the information related to the status of the memory 220 may include at least one of an erase time, a write time, and a read time. In addition, the information related to the status of the memory 220 may include a total number of error bits verified when performing a read operation.

The PPA command will be described further with reference to FIGS. 3A through 5B.

The host 100 may inform the SSD device 200 of a presence of a new command such as the PPA command using a submission queue tail doorbell register.

The SSD device 200 may include the controller 210 and the memory 220. The controller 210 may fetch and process a command of the submission queue 110. The controller 210 may perform an operation based on the PPA command received from the submission queue 110. For example, the controller 210 may perform an operation of reading, writing, erasing, copying, or initializing (or resetting) data of the memory 220.

The controller 210 may report a result of the operation with respect to the PPA command to the host 100 through the completion queue 120. That is, the controller 210 may input a processing result into the completion queue 120. In this example, the controller 210 may cause an interrupt, thereby controlling the host 100 to interrupt a program being executed and execute another program. The interrupt may be MSI_X interrupt.

The host 100 may verify the completion queue 120, thereby verifying a result of processing the PPA command. The host 100 may complete data processing using a completion queue head doorbell register.

Figure 3A:
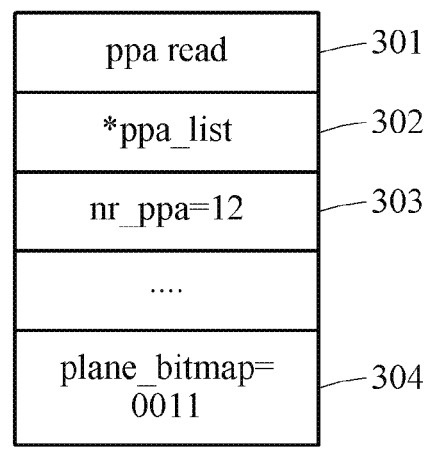

FIGS. 3A through 3C illustrate a PPA command, a PPA list, and a sector bitmap for a read operation.

Referring to FIG. 3A, a PPA command to perform a read operation is illustrated.

The PPA command may include an Opcode 301, a PPA list 302, a total number of PPAs 303, and a plane bitmap 304.

A controller of an SSD device may perform the operation by referring to the Opcode 301. For example, the controller may verify that the Opcode 301 is a read command and read data of a memory.

The controller of the SSD device may verify information related to a plane on which an operation of the Opcode 301 is to be performed by referring to the plane bitmap 304. For example, the controller may verify that the plane bitmap 304 is "0011", and read a zeroth plane and a first plane in the memory. If the plane bitmap 304 is "1100", the controller may read a second plane and a third plane in the memory.

The controller of the SSD device may verify a position of an individual PPA by referring to the PPA list 302 and read data. The PPA list 302 will be described further with reference to FIGS. 3B and 3C.

The controller of the SSD device may verify a total number of PPAs in the plane on which the operation is to be performed by referring to the total number of PPAs 303. For example, a total number of PPAs in the zeroth plane and the first plane on which the controller is to perform the read operation may be "12".

Referring to FIG. 3B, the PPA list 302 is illustrated. The controller of the SSD device may read data of the memory of FIG. 3C by referring to the PPA list 302. A single cell 330 of the memory of FIG. 3C may refer to a sector in a case of Version 1.2 of open-channel SSD or a logical block in a case of Version 2.0 of open-channel SSD.

The controller may read data of sectors corresponding to "1111" on a zeroth page 321 of a zeroth plane based on a zeroth PPA 311. For example, the controller may read only data of sectors corresponding to "1"s of "1111". In this example, the zeroth PPA 311 may further include information related to a channel (ch), a logical unit number (lun), a block (blk), and a page (pg), in addition to the sector bitmap "1111". In a PPA command, plane information is written on the plane bitmap 304, and thus all PPAs including the zeroth PPA 311 may not include information related to a plane (pln). Further, since the controller sequentially reads data of the pages, all the PPAs including the zeroth PPA 311 may also not include information related to a sector (sect).

The controller may read data of sectors corresponding to "0101" on a zeroth page 322 of a first plane based on a first PPA 312. For example, the controller may read only data of sectors corresponding to "1"s of "0101". In this example, the first PPA 312 may include information related to a block (blk') with respect to the zeroth page 322 of the first plane. However, since the controller sequentially reads data of pages at the first PPA 312, information related to a channel (ch), a logical unit number (lun), and a page (pg) that may be extracted from the information of the zeroth PPA 311 may be omitted. In a case in which the information related to the block (blk') with respect to the zeroth page 322 of the first plane is identical to the information related to the block (blk) with respect to the zeroth page 321 of the zeroth plane or is extractable, the information related to the block (blk') may also be omitted.

The controller may read data of sectors corresponding to "1001" on a first page 323 of the zeroth plane based on a second PPA 313. For example, the controller may read only data of sectors corresponding to "1"s of "1001".

The controller may read data of sectors corresponding to "0000" on a first page 324 of the first plane based on a third PPA 314. For example, since sector bitmap information at the third PPA 314 is "0000", the controller may not read data of the corresponding sectors.

The controller may read data of sectors corresponding to "1000" on a second page 325 of the zeroth plane based on a fourth PPA 315. For example, the controller may read only data of a sector corresponding to "1" of "1000".

The controller may read data of sectors corresponding to "0001" on a second page 326 of the first plane based on a fifth PPA 316. For example, the controller may read only data of a sector corresponding to "1" of "0001".

The controller may read data of sectors corresponding to "0000" on a third page 327 of the zeroth plane based on a sixth PPA 317. For example, since sector bitmap information at the sixth PPA 317 is "0000", the controller may not read data of the corresponding sectors.

The controller may read data of sectors corresponding to "0110" on a third page 328 of the first plane based on a seventh PPA 318. For example, the controller may read only data of sectors corresponding to "1"s of "0110".

As described above, instead of writing 32 PPAs for individual sectors 330 on a PPA list, all the data may be expressed using only 8 PPAs. Thus, the PPA list may be simplified and a size thereof may be reduced.

FIGS. 3A through 3C illustrate, for ease of description, an example in which the SSD device is implemented as a quad-layer cell (QLC). However, the example embodiments are not limited thereto. The SSD device may be implemented as a single-layer cell (SLC), a multi-layer cell (MLC), or a triple-layer cell (TLC).

Figure 4A:
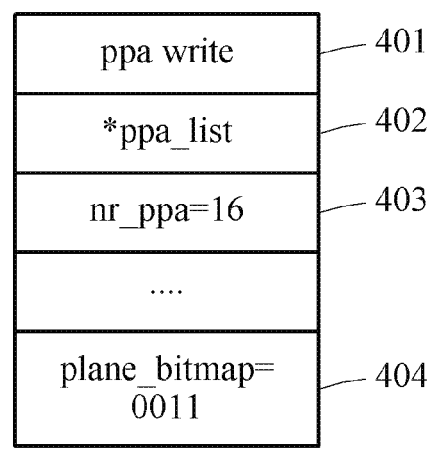

FIGS. 4A through 4C illustrate a PPA command, a PPA list, and a page bitmap for a write operation.

Referring to FIG. 4A, a PPA command to perform a write operation is illustrated.

The PPA command may include an Opcode 401, a PPA list 402, a total number of PPAs 403, and a plane bitmap 404.

A controller of an SSD device may perform the operation by referring to the Opcode 401. For example, the controller may verify that the Opcode 401 is a write command, and write data on a memory.

The controller of the SSD may verify information related to a plane on which an operation of the Opcode 401 is to be performed by referring to the plane bitmap 404. For example, the controller may verify that the plane bitmap 404 is "0011" and write data on a zeroth plane and a first plane in the memory. If the plane bitmap 404 is "1100", the controller may write data on a second plane and a third plane in the memory.

The controller of the SSD device may verify a position of an individual PPA by referring to the PPA list 402 and write data. The PPA list 402 will be described further with reference to FIGS. 4B and 4C.

The controller of the SSD device may verify a total number of PPAs in the plane on which the operation is to be performed by referring to the total number of PPAs 403. For example, a total number of PPAs in the zeroth plane and the first plane on which the controller is to perform the read operation may be "16".

Referring to FIG. 4B, the PPA list 402 is illustrated. The controller of the SSD device may write data on the memory of FIG. 4C by referring to the PPA list 402. A single cell of the memory of FIG. 4C may refer to a sector in a case of Version 1.2 of open-channel SSD or a logical block in a case of Version 2.0 of open-channel SSD.

The controller may write data on pages corresponding to "0011" in a zeroth plane based on a zeroth PPA 411. For example, the controller may write data on a zeroth page and a first page corresponding to "1"s of "0011". The zeroth PPA 411 may further include information related to a channel (ch), a logical unit number (lun), a block (blk), and a page (pg), in addition to the page bitmap "0011". That is, in a PPA command, plane information is written on the plane bitmap 404, and thus all PPAs including the zeroth PPA 411 may not include information related to a plane (pln). Further, since the controller sequentially writes data on the pages, all the PPAs including the zeroth PPA 411 may also not include information related to a sector (sect).

The controller may write data on pages corresponding to "0011" in a first plane based on a first PPA 412. For example, the controller may write data on a zeroth page and a first page corresponding to "1"s of "0011". The first PPA 412 may further include information related to a block (blk') with respect to a page of the first plane, in addition to the page bitmap "0011". However, since the controller sequentially writes data on the pages, information related to a channel (ch), a logical unit number (lun), and a page (pg) that may be extracted from the information of the zeroth PPA 411 may be omitted from the first PPA 412. In a case in which the information related to the block (blk') with respect to the page of the first plane is identical to the information related to a block (blk) with respect to a zeroth page of the zeroth plane or is extractable, the information related to the block (blk') may also be omitted.

A PPA list of a PPA command that the controller receives subsequently may include a page bitmap of "1100". That is, the controller may write data on a second page and a third page of the zeroth plane, and write data on a second page and a third page of the first plane.

Instead of incorporating 8 PPAs for individual pages in the PPA command, all the data may be expressed using only 2 PPAs. Thus, the PPA list may be simplified and a size thereof may be reduced.

FIGS. 4A through 4C illustrate, for ease of description, an example in which the SSD device is implemented as a QLC. However, the example embodiments are not limited thereto. The SSD device may be implemented as an SLC, an MLC, or a TLC. Further, an example in which the QLC-based SSD device performs a write operation in a unit of two pages with a 2-shot program is described. However, it is obvious that a TLC-based SSD device may perform a write operation in a unit of three pages with a 1-shot program.

Figure 5A:
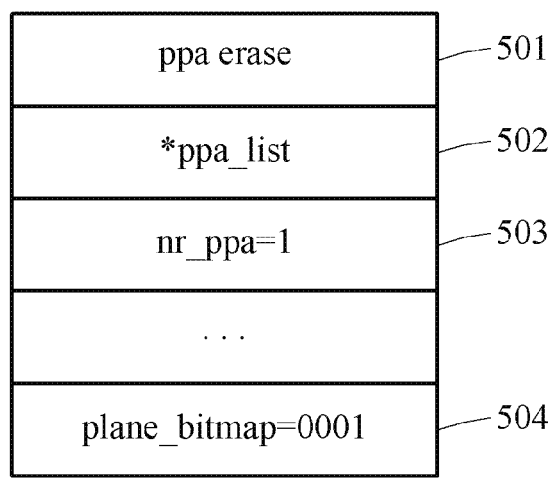
Figure 5C:
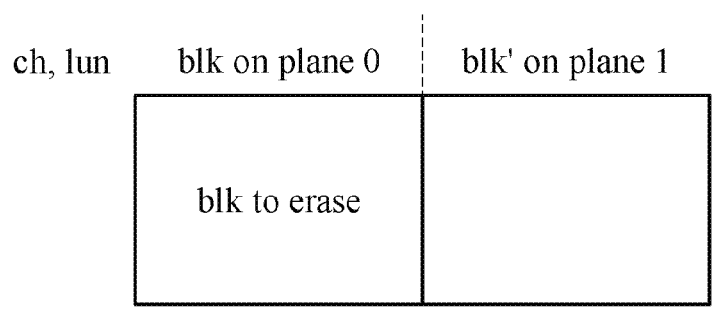

FIGS. 5A through 5C illustrate a PPA command, a PPA list, and a page bitmap for an erase operation.

Referring to FIG. 5A, a PPA command to perform an erase operation is illustrated.

The PPA command may include an Opcode 501, a PPA list 502, a total number of PPAs 503, and a plane bitmap 504.

A controller of an SSD device may perform the operation by referring to the Opcode 501. For example, the controller may verify that the Opcode 501 is an erase command and erase a block of a memory.

The controller of the SSD device may verify information related to a plane on which an operation of the Opcode 501 is to be performed by referring to the plane bitmap 504. For example, the controller may verify that the plane bitmap 504 is "0001", and erase a block of a zeroth plane in the memory. That is, FIG. 5A relates to a case of being erased from a single plane.

The controller of the SSD device may verify a position of an individual PPA by referring to the PPA list 502, and erase a block. The PPA list 502 will be described further with reference to FIGS. 5B and 5C.

The controller of the SSD device may verify a total number of PPAs in the plane on which the operation is to be performed by referring to the total number of PPAs 503. For example, a total number of PPAs in the zeroth plane on which the controller is to perform the erase operation may be "1".

Referring to FIG. 5B, the single PPA 502 is illustrated. The controller of the SSD device may erase a block of the memory of FIG. 5C by referring to the PPA list 502. A single cell of the memory of FIG. 5C may refer to a block.

The controller may erase a block of the zeroth plane based on a zeroth PPA 511. The zeroth PPA 511 may include information related to a channel (ch), a logical unit number (lun) and a block (blk). In a PPA command, plane information is written on the plane bitmap 504, and thus the zeroth PPA 511 may not include information related to a plane (pln). Further, since the controller sequentially erases data from blocks, the zeroth PPA 511 may not include information related to a page (page) and a sector (sect).

Figure 6A:
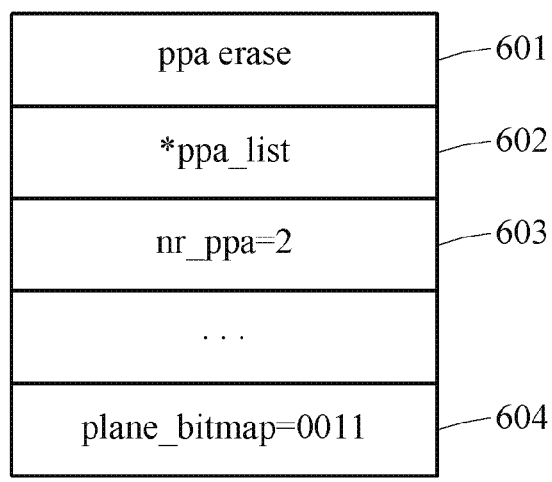
Figure 6C:
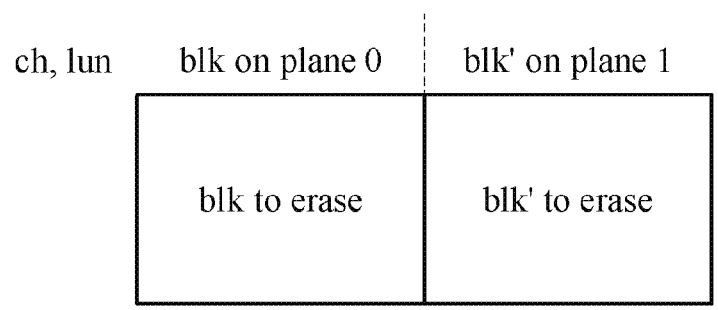

FIGS. 6A through 6C illustrate a PPA command, a PPA list, and a page bitmap for an erase operation.

Referring to FIG. 6A, a PPA command to perform an erase operation is illustrated.

The PPA command may include an Opcode 601, a PPA list 602, a total number of PPAs 603, and a plane bitmap 604.

A controller of an SSD device may perform the operation by referring to the Opcode 601. For example, the controller may verify that the Opcode 601 is an erase command and erase a block of a memory.

The controller of the SSD device may verify information related to a plane on which an operation of the Opcode 601 is to be performed by referring to the plane bitmap 604. For example, the controller may verify that the plane bitmap 604 is "0011", and erase blocks of a zeroth plane and a first plane in the memory. That is, FIG. 6A relates to a case of being erased from multiple planes.

The controller of the SSD device may verify a position of an individual PPA by referring to the PPA list 602, and erase a block. The PPA list 602 will be described further with reference to FIGS. 6B and 6C.

The controller of the SSD device may verity a total number of PPAs in the planes on which the operation is to be performed by referring to the total number of PPAs 603. For example, a total number of PPAs in the zeroth plane and the first plane on which the controller is to perform the erase operation may be "2".

Referring to FIG. 6B, the PPA list 602 is illustrated. The controller of the SSD device may erase a block of the memory of FIG. 6C by referring to the PPA list 602. A single cell of the memory of FIG. 6C may refer to a block.

The controller may erase a block of a zeroth plane based on a zeroth PPA 611. The zeroth PPA 611 may include information related to a channel (ch), a logical unit number (lun), a block (blk). In a PPA command, plane information is written on the plane bitmap 604, and thus the zeroth PPA 611 may not include information related to a plane (pln). Further, since the controller sequentially erases data from blocks, the zeroth PPA 611 may not include information related to a page (page) and a sector (sect).

The controller may erase a block of a first plane based on a first PPA 612. The first PPA 612 may further include information related to a block (blk'). However, since the controller sequentially erases data from blocks, information related to a channel (ch) and a logical unit number (lun) that may be extracted from the information of the zeroth PPA 611 may be omitted from the first PPA 612. In a case in which the information related to the block (blk') of the first plane is identical to the information related to the block (blk) of the zeroth plane or extractable, the information related to the block (blk') may also be omitted.

Figure 7A:
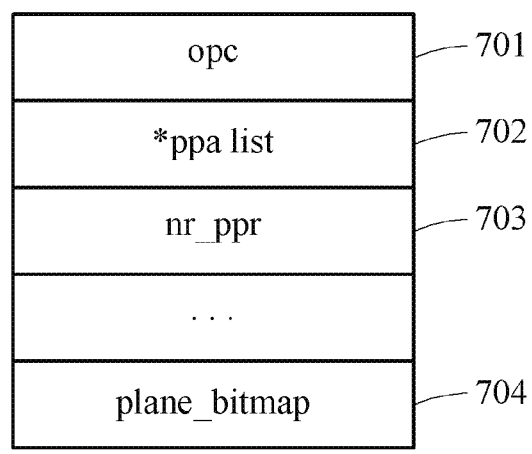
FIGS. 7A and 7B illustrate a PPA command.
Figure 7B:
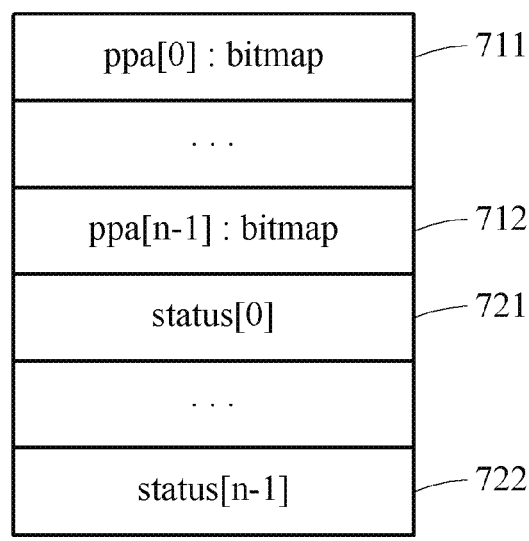

FIGS. 7A and 7B illustrate a PPA command.

Referring to FIG. 7A, a PPA command may include an Opcode (opc) 701, a PPA list (*ppa list) 702, a total number of PPAs (nr_ppa) 703, and a plane bitmap (plane_bitmap) 704. The Opcode 701, the total number of PPAs 703, and the plane bitmap 704 of FIG. 7A may have substantially the same configuration as the Opcode 301, 401, 501 or 601, the total number of PPAs 303, 403, 503 or 603, and the plane bitmap 304, 404, 504 or 604 of FIG. 3A, 4A, 5A or 6A. Hereinafter, the PPA list 702 will be described.

Referring to FIG. 7B, the PPA list 702 is illustrated. The PPA list 702 may include bitmap information related to a zeroth PPA 711 through an (n−1)-th PPA 712, and status information 721 through 722 of a memory.

The status information 721 through 722 of the memory may include information related to characteristics of NAND. Both a host and an SSD device may share a size and a structure of a region of the status information 721 through 722 of the memory.

For example, the status information 721 through 722 of the memory may include at least one of a time used to erase data, a time used to write data, and a time used to read data.

Further, the status information 721 through 722 of the memory may include a total number of error bits verified when reading data.

Figure 8:
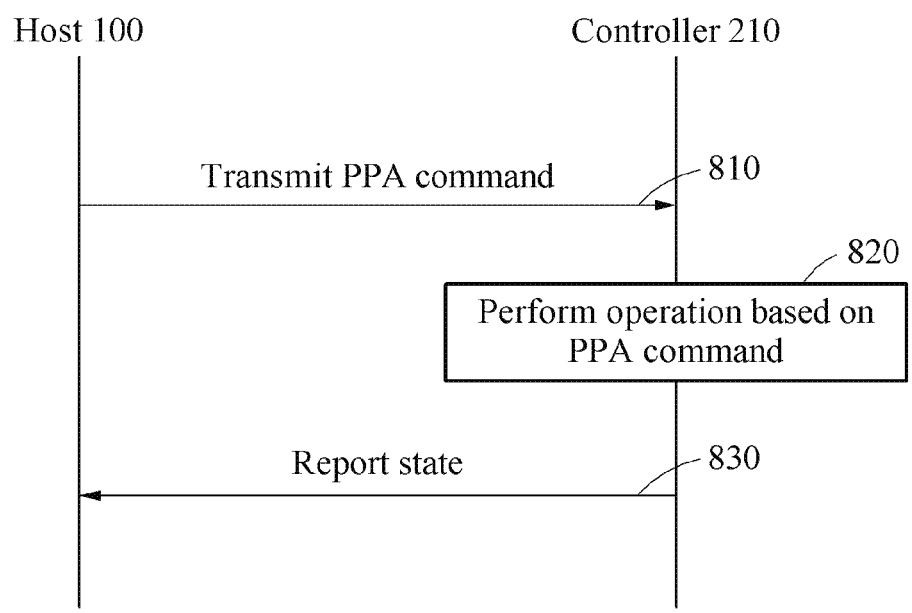
FIG. 8 illustrates an operation of an SSD system.

FIG. 8 illustrates an operation of an SSD system.

Referring to FIG. 8, in operation 810, the host 100 may transmit a PPA command to the controller 210. The PPA command may include an Opcode to operate the controller 210 and a PPA list for the controller 210 to perform the Opcode on the memory 220. The Opcode may be represented as in Tables 2 through 5. The Opcode may refer to a command operation code. The PPA command may include a plane bitmap with respect to a plane on which the controller 210 is to perform an operation in the memory. Further, the PPA command may include a total number of at least one PPA included in the PPA list.

In operation 820, the controller 210 may perform an operation based on the PPA command. For example, the controller 210 may perform an operation of initializing, reading, writing, erasing, or copying with respect to the memory.

In operation 830, the controller 210 may report a state related to a result of the operation to the host 100.

The method according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A communication method for a host and a controller, the communication method comprising:
 transmitting, by the host, a physical page address (PPA) command to the controller using a submission queue; and
 performing, by the controller, an operation based on the PPA command,
 wherein the PPA command includes an operation code (Opcode) to operate the controller and a PPA list for the controller to perform the Opcode on a memory,
 the PPA list includes at least one PPA and bitmap information related to the at least one PPA, and
 the PPA command further includes a total number of the at least one PPA.

2. The communication method of claim 1, wherein the bitmap information includes bitmap information to perform a read operation on a sector of the memory.

3. The communication method of claim 2, wherein the PPA list further includes information related to a channel, a logical unit number, a block, and a page with respect to a first PPA among the at least one PPA to perform the read operation.

4. The communication method of claim 2, wherein the PPA list further includes information related to a block with respect to a second PPA among the at least one PPA to perform the read operation.

5. The communication method of claim 1, wherein the bitmap information includes bitmap information to perform a write operation on a page of the memory.

6. The communication method of claim 5, wherein the PPA list further includes information related to a channel, a logical unit number, a block, and a page with respect to a first PPA among the at least one PPA to perform the write operation.

7. The communication method of claim 5, wherein the PPA list further includes information related to a block with respect to a second PPA among the at least one PPA to perform the write operation.

8. The communication method of claim 1, wherein the PPA list further includes information related to at least one of a channel, a logical unit number, a plane, a block, a page, and a sector with respect to the at least one PPA.

9. The communication method of claim 1, wherein the PPA command further includes bitmap information related to a plane on which the controller is to perform the operation in the memory.

10. The communication method of claim 1, wherein the PPA list further includes status information of the memory.

11. The communication method of claim 10, wherein the status information of the memory includes at least one of an erase time, a write time, and a read time.

12. The communication method of claim 10, wherein the status information of the memory includes a total number of error bits verified when performing a read operation.

13. A non-transitory computer-readable storage medium storing instructions that, when executed by a processor, cause the processor to perform the communication method of claim 1.

* * * * *